Figure 1:
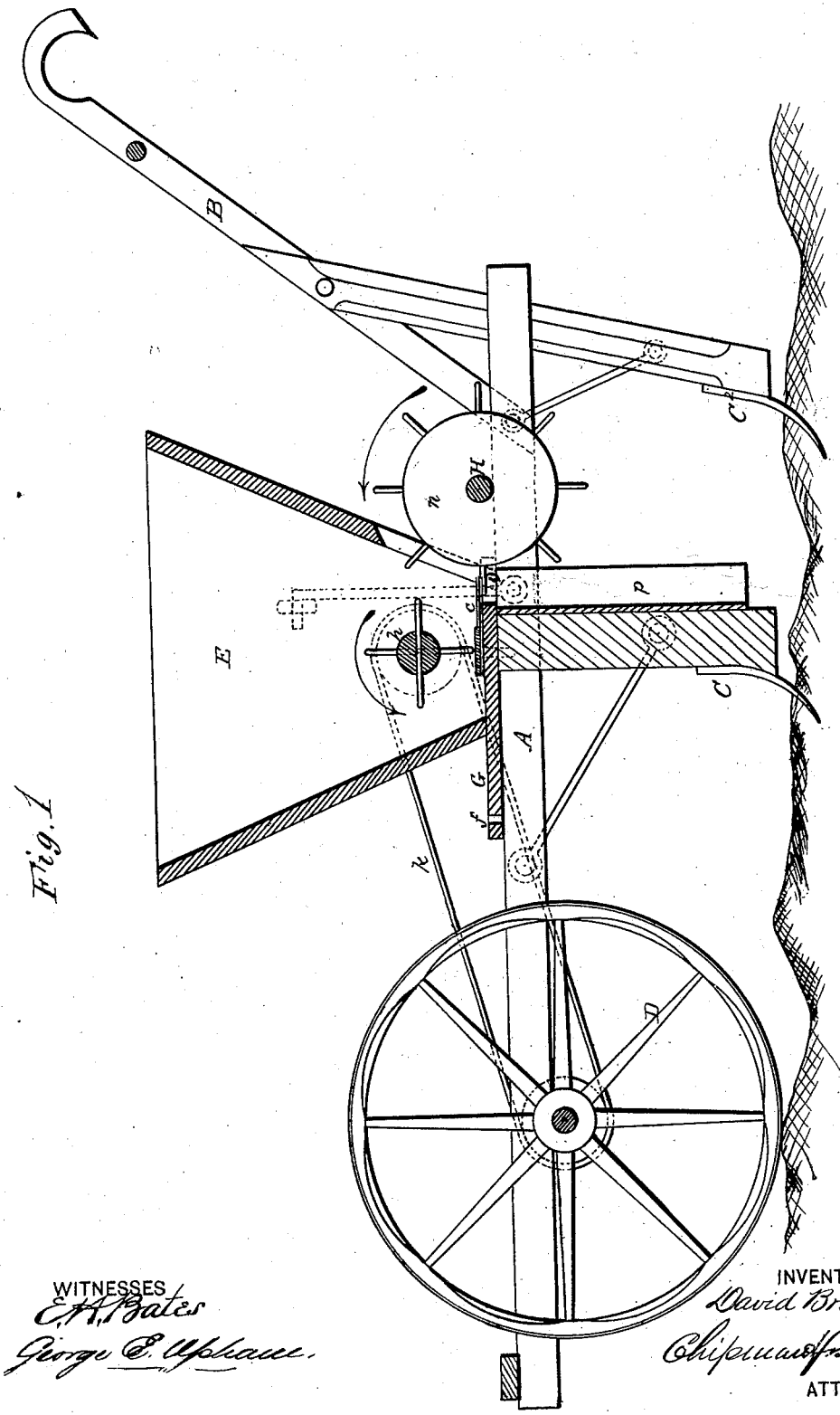

D. BRONAUGH.
Cotton-Planter.

No. 198,076. Patented Dec. 11, 1877.

WITNESSES
E. H. Bates
George P. Upham

INVENTOR
David Bronaugh
Chipman and Smith
ATTORNEYS

N. PETERS, PHOTO-LITHOGRAPHER, WASHINGTON, D. C.

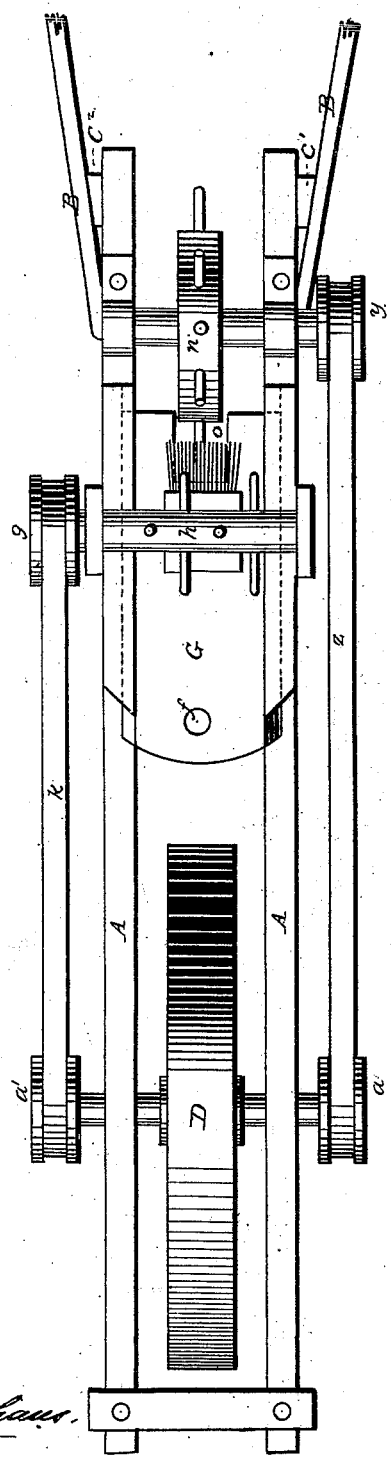

UNITED STATES PATENT OFFICE.

DAVID BRONAUGH, OF KENTUCKY TOWN, TEXAS.

IMPROVEMENT IN COTTON-PLANTERS.

Specification forming part of Letters Patent No. 198,076, dated December 11, 1877; application filed November 17, 1877.

*To all whom it may concern:*

Be it known that I, DAVID BRONAUGH, of Kentucky Town, in the county of Grayson and State of Texas, have invented a new and valuable Improvement in Cotton-Planters; and I do hereby declare that the following is a full, clear, and exact description of the construction and operation of the same, reference being had to the annexed drawings, making a part of this specification, and to the letters and figures of reference marked thereon.

Figure 1 of the drawing is a representation of a longitudinal vertical section of my cotton-planter, and Fig. 2 is a plan view of the same.

My invention relates to machines for planting cotton-seeds; and consists in the combination of the means described for dropping the grain and the sliding bottom beneath the hopper, as specified and claimed.

A of the drawings represents two parallel bars, which constitute the frame of my planter. B represents the handles, and C $C^1$ $C^2$ the opening and covering plows, respectively. D represents a driving-wheel, to the journal of which are attached two pulleys, $a$ $a'$, as shown on Fig. 2. E represents the hopper or seed-holder, under which, and upon the frame A, I arrange the sliding bottom G. This bottom has a rectangular opening, $o$, in its rear end for the passage of the seed downward, in which I affix a brush, (marked $c$.) It has also an opening or handle at its front end, (marked $f$,) by which the operator is enabled to adjust it in the desired position or remove it, at will.

The letter $h$ represents a shaft, having a series of teeth upon its surface, adapted for agitating the cotton-seed inside the hopper, and drawing such seed toward the exit thereof through the sliding bottom G. This shaft has a pulley, $g$, on one end, as shown on Fig. 2, and is actuated by a belt or cord, $k$, by which it is connected with the pulley $a'$ of the driving-wheel.

The letter H represents a shaft arranged upon the frame at the rear of the hopper. This shaft is provided with a toothed drum, $n$, and a pulley, $y$, arranged and constructed as shown in the drawings. The pulley $y$ is connected with the pulley $a$ of the driving-wheel by the belt or cord $z$, and the shaft is actuated thereby. The letter $p$ represents a gutter or spout, down which the seed is passed to the ground.

What I claim as new, and desire to secure by Letters Patent, is—

The slotted hopper E, with its sliding bottom G, having slot $o$ and brush $c$, in combination with the toothed shaft $h$, toothed drum $n$, plow C, and seed-tube $p$, the whole constructed, arranged, and operated in the manner and for the purpose set forth.

In testimony that I claim the above I have hereunto subscribed my name in the presence of two witnesses.

DAVID BRONAUGH.

Witnesses:
A. J. RAY, M. D.,
P. McKENNA.